Feb. 17, 1925.
T. M. HAMILTON
1,527,131
DRIVING ROD
Filed March 21, 1924
2 Sheets-Sheet 1
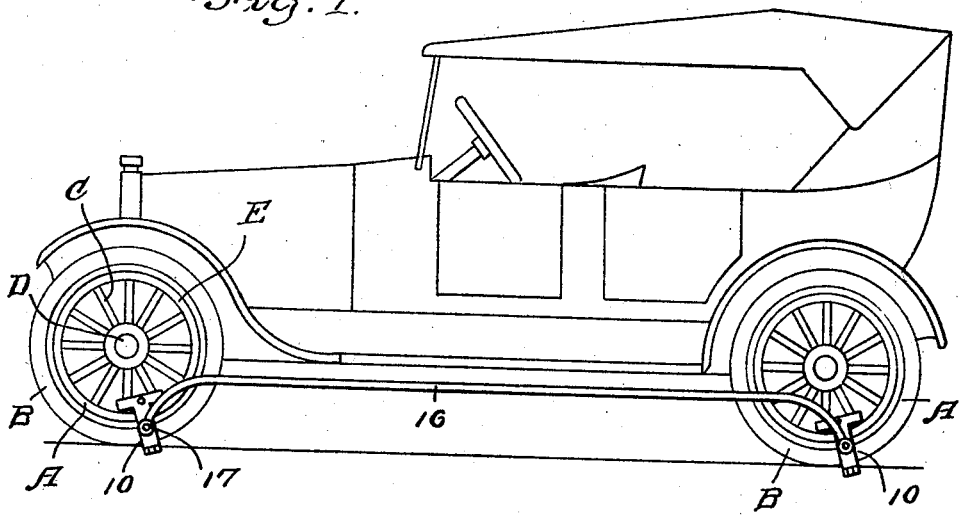
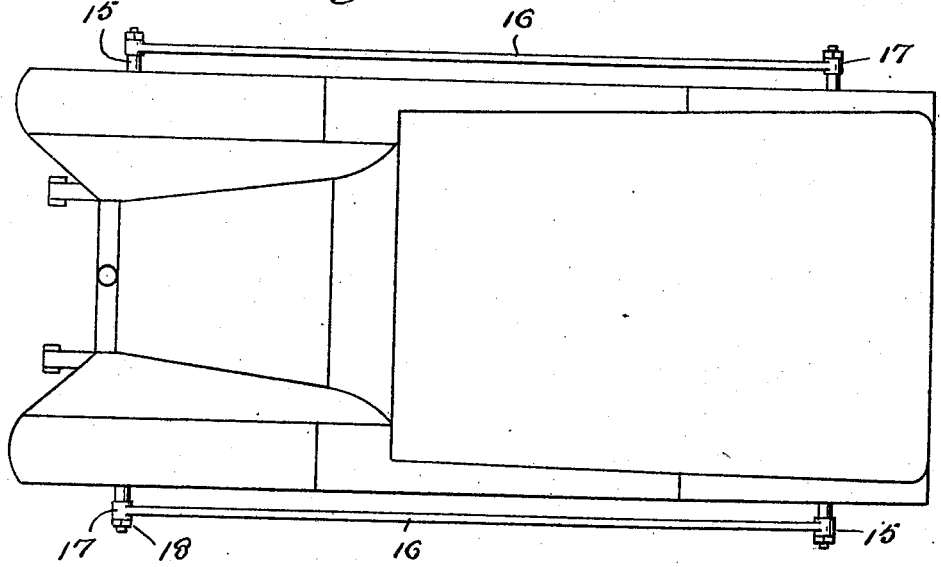
T. M. Hamilton
INVENTOR
BY Victor J. Evans
ATTORNEY Feb. 17, 1925.
T. M. HAMILTON
1,527,131
DRIVING ROD
Filed March 21, 1924  2 Sheets-Sheet 2
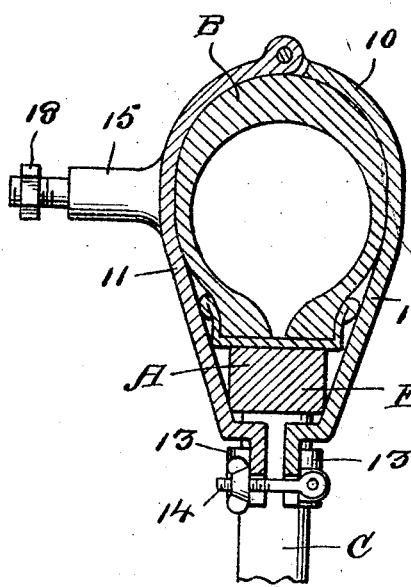
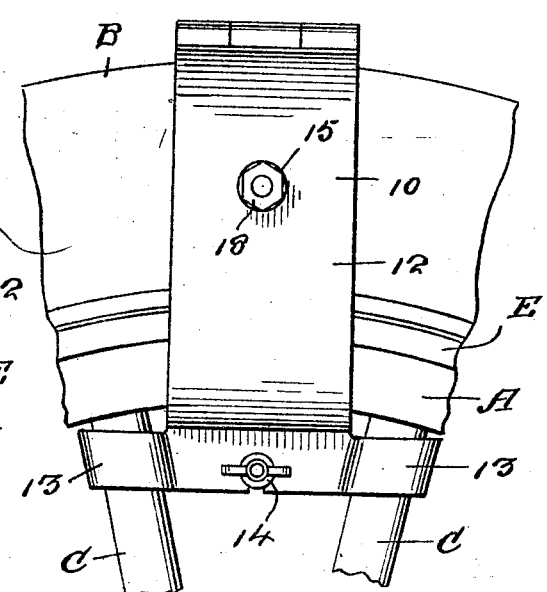
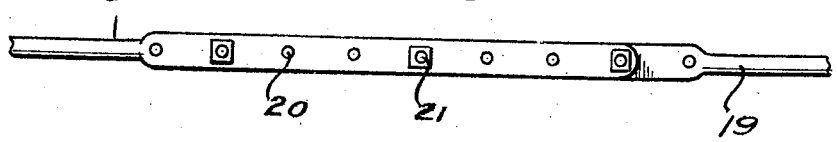
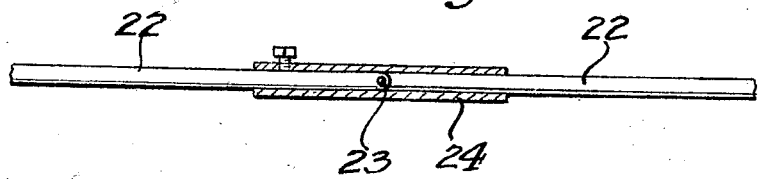
T. M. Hamilton
INVENTOR Patented Feb. 17, 1925.

1,527,131

UNITED STATES PATENT OFFICE.

TYRE M. HAMILTON, OF HAPEVILLE, GEORGIA.

DRIVING ROD.

Application filed March 21, 1924. Serial No. 700,896.

*To all whom it may concern:*

Be it known that I, TYRE M. HAMILTON, a citizen of the United States, residing at Hapeville, in the county of Fulton and State of Georgia, have invented new and useful Improvements in Driving Rods, of which the following is a specification.

This invention relates to accessories for use in connection with motor vehicles and has for its object the provision of a device adapted to be engaged upon the front and rear wheels at one side of the car whereby they will move in unison, thus applying power to the front wheel which will assist in extracting the vehicle from a mud hole or the like.

An important object is the provision of a connecting or driving rod device of this character which may be used at either one or both sides of the car or other vehicle and so constructed as to be interchangeable and also adjustable for use upon vehicles of different sizes.

Yet another object is the provision of a device of this character which may be folded or collapsed when not in use so as to occupy but little room during storage or transportation.

The invention further contemplates the provision of novel clamping means for connecting the device with the wheels, and has for an additional object the provision of a device of this character which will be simple and inexpensive in manufacture, easy to apply, positive in action, efficient and durable, and a general improvement in the art.

With the above and other objects and advantages in view the invention consists in the details of construction to be hereinafter more fully described and claimed and illustrated in the accompanying drawings, in which:

Figure 1 is a side elevation of a vehicle equipped with my invention,

Figure 2 is a plan view,

Figure 3 is a section through one of the clamping devices,

Figure 4 is a side elevation thereof,

Figure 5 is a side elevation of a modified form of the device which is adjustable, Figure 6 is an elevation with parts broken away and in section illustrating another modification.

Referring more particularly to the drawings, the letter A designates the wheels of a vehicle equipped with the usual tires B and having ordinary spokes C which radiate from the hub D and which connect with the felly E.

In carrying out my invention I provide an attaching device for the front and rear wheels, which attaching device is of the same construction regardless of whether it be used on the front or the rear wheels. This attaching device comprises a clamp designated broadly by the numeral 10 and formed of separable sections 11 and 12 of a size to embrace the tire and rim and to be disposed between two successive spokes. The sections 10 are formed with outward depressions 13 which mate for the accommodation of the spokes. The sections are held in place by suitable bolts 14, and one section is provided with an outwardly extending trunnion 15.

For connecting the two devices at either side of the vehicle, I provide an elongated bar 16 which is formed at its ends with bearings 17 engaged upon the trunnions 15 and held thereon as for instance by nuts 18 screwed onto the trunnions. Naturally, cotter pins or other equivalent devices may be used for preventing the bar from slipping off from the trunnions. The trunnions 15 must be of sufficient length that the bar will clear the running board of the car and the hubs of the wheels. To avoid having the bar come in contact with the surface traveled over, except at its ends, it is preferable that it be of arch shape as clearly indicated.

In Figure 5 I have shown a modified form of the device in which the bar is formed of two sections 19 having holes 20 therein adapted to be brought into registration for receiving bolts 21. By this construction it is obvious that the two sections may be extended or contracted at will depending upon the wheel base of the car on which the device is to be used. Naturally by removing the bolts, the two sections will occupy comparatively little room in storage or transportation as the length of the bar is thus reduced by substantially one-half.

In Figure 6 I have shown another modification in which the bar is shown as formed of similar sections 22 which are pivotally connected at 23 by a suitable rule or other joint. In this form it is preferable to provide a sleeve 24 which is slidable and which is engaged over the joint when the device is in use.

In the operation it will be apparent that if the vehicle has one or both wheels at either side stuck in a mud hole or other soft place, ditch or the like, the application of my driving rod will permit the vehicle to pull itself out as the driving power is applied not only to the wheel which is mired or bogged but also to the other wheel on the same side.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. A device of the character described comprising a pair of separable clamping members adapted for engagement upon the front and rear wheels of a motor vehicle, said members being provided with trunnions and an elongated bar having its ends pivotally engaged upon said trunnions.

2. A device of the character described comprising a pair of separable clamping members adapted for engagement upon the front and rear wheels of a motor vehicle, said members being formed with trunnions and an elongated bar having its ends pivotally engaged upon said trunnions, said bar being of arch shape whereby to avoid contact with the ground at points other than the ends.

3. A device of the character described comprising a pair of separable clamping members adapted for engagement upon the front and rear wheels of a motor vehicle, said members being formed with trunnions and an elongated bar having its ends pivotally engaged upon said trunnions, and means for adjusting the length of the bar.

4. A device of the character described comprising a pair of separable clamping members adapted for engagement upon the front and rear wheels of a motor vehicle, said members being formed with trunnions and an elongated bar having its ends pivotally engaged upon said trunnions, the bar being collapsible to reduce its length when not in use.

5. In a device of the character described, attaching means at each end of an elongated driving bar, the attaching means consisting of separable sections formed from embracing engagement upon the rim and tire of a wheel, the sections being formed with mating depressions for accommodating adjacent spokes of the wheel.

In testimony whereof I affix my signature.

TYRE M. HAMILTON.